United States Patent [19]
Hofmann et al.

[11] 3,975,749
[45] Aug. 17, 1976

[54] CONTINUOUS MICROFILMING CAMERA

[75] Inventors: Wilfried Hofmann, Taufkirchen; Karl-Heinz Dietrich; Walter Rauffer, both of Munich; Eugen Schuhmeir, Neubiberg; Reinhard Köhler, Munich, all of Germany

[73] Assignee: AGFA-Gevaert, A.G., Leverkusen, Germany

[22] Filed: Mar. 27, 1975

[21] Appl. No.: 562,428

[30] Foreign Application Priority Data
Mar. 28, 1974 Germany............... 7410967[U]

[52] U.S. Cl. .................. 354/195; 350/255; 354/212; 354/286
[51] Int. Cl.² ........................................ G03B 3/00
[58] Field of Search ........... 354/212, 202, 286, 195, 354/98; 350/255, 252, 84; 355/47, 48, 72; 352/228, 139, 138; 353/101, 39

[56] References Cited
UNITED STATES PATENTS
| | | | |
|---|---|---|---|
| 2,256,245 | 9/1941 | Fricke .................... | 350/84 |
| 3,424,524 | 1/1969 | Akiyama et al. ............ | 353/39 X |
| 3,511,149 | 5/1970 | Blattner et al. ........... | 354/4 |
| 3,525,291 | 8/1970 | Haramata et al. .......... | 354/203 |

Primary Examiner—Joseph W. Hartary
Attorney, Agent, or Firm—Michael J. Striker

[57] ABSTRACT

A continuous microfilming camera wherein the film is trained over a large driven roller so that its emulsion-coated side faces a lens which is installed in a tubular mount. The roller is rotatable about a fixed axis and the mount is reciprocable in the housing of the camera substantially radially of the roller. Two positioning rolls at the front end of the mount contact the emulsion-coated side of that portion of the film which is trained around the roller and are biased against the emulsion-coated side by springs which react against the housing and bear against the mount. The rolls are disposed at the opposite sides of the optical axis of the lens, and the driven roller cooperates with two guide rollers which insure that the film is trained over the major part of the peripheral surface of the driven roller.

10 Claims, 1 Drawing Figure

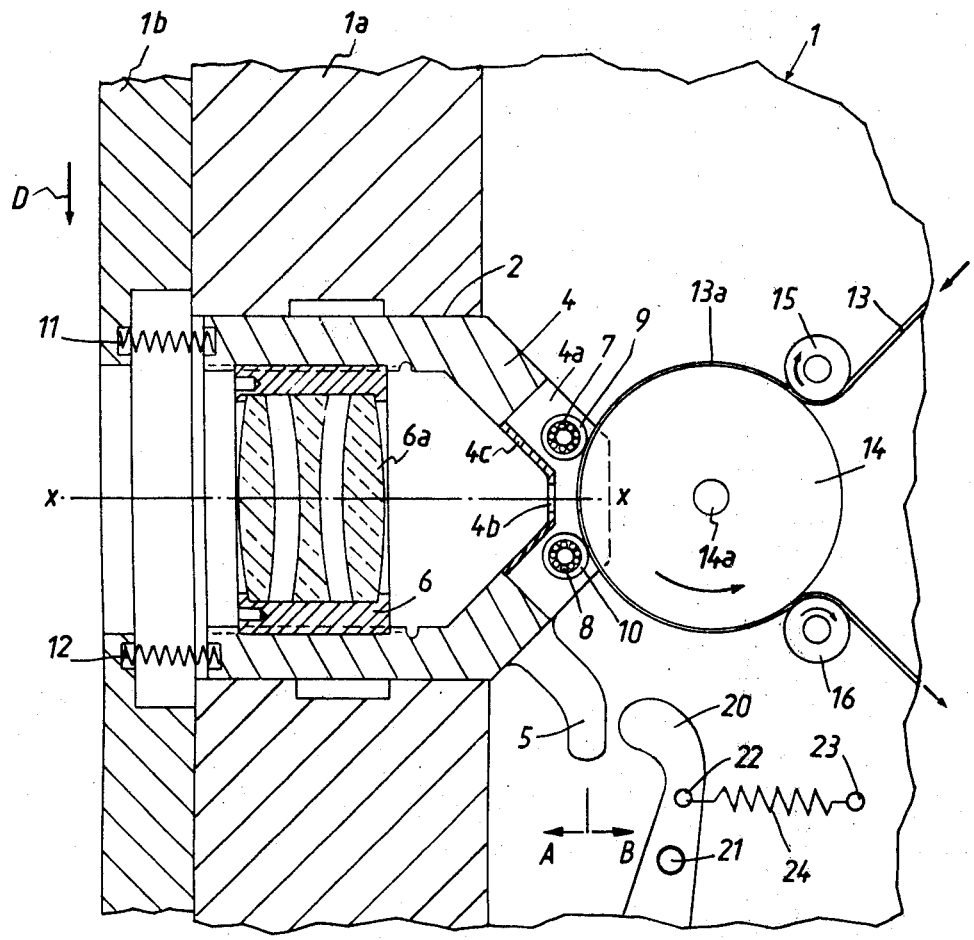

CONTINUOUS MICROFILMING CAMERA

BACKGROUND OF THE INVENTION

The present invention relates to photographic apparatus in general, especially to continuous microfilming cameras, and more particularly to improvements in cameras of the type wherein minute stray movements of photographic film relative to the lens or vice versa can greatly affect the quality of exposures.

It is known to maintain the lens of a microfilming camera at a substantially constant distance from the emulsion-coated side of the film by providing the support for the lens with several positioning rolls which contact the emulsion-coated side and by urging a spring-biased pressure plate against the uncoated side of the film opposite the positioning rolls. The film is moved lengthwise by several driven rollers which are remote from the positioning rolls. Reference may be had to the commonly owned German Utility Model No. 6,946,380. Such transport of film between the positioning rolls and the pressure plate insures that the distance between the lens and the emulsion-coated side does not vary in response to fluctuations in the thickness of the film. However, the transporting rollers cannot insure that the speed of the film remains constant or that such speed fluctuates within a sufficiently narrow range. For example, uneven transport of film may be due to lack of synchronization between the drive means for the transporting rollers. Fluctuations in the speed of lengthwise movement of film are particularly undesirable in continuous microfilming cameras.

SUMMARY OF THE INVENTION

An object of the invention is to provide a novel and improved photographic apparatus, especially a continuous microfilming camera, wherein fluctuations in the speed of lengthwise movement of photographic film are eliminated or reduced to a permissible minimum.

Another object of the invention is to provide a camera wherein a single driven element suffices to transport the film at a desired speed and without any or with negligible fluctuations in the rate of speed.

A further object of the invention is to provide a novel and improved mounting for the lens in a continuous microfilming camera.

An additional object of the invention is to provide the camera with novel and improved means for facilitating the threading of fresh film.

Still another object of the invention is to provide a continuous microfilming camera wherein fluctuations in the speed of lengthwise movement of the film are eliminated simultaneously with elimination of adverse effects of changes in film thickness upon the quality of exposures.

The invention is embodied in a photographic apparatus, especially in a continuous microfilming camera, which comprises a housing, means for transporting photographic film along a predetermined path and including a driven roller which is rotatable in the housing about a fixed axis and over which the film is trained is such a way that the emulsion-coated side of the film faces outwardly, a tubular support (e.g., a cylindrical mount) which is reciprocable in the housing substantially radially of the driven roller and is adjacent to that portion of the film which is trained over the driven roller, a lens installed in the support and serving to image originals onto the emulsion-coated side of that portion of the film which is trained over the driven roller, positioning means including at least one roll which is rotatably mounted in the support between the lens and the driven roller and whose diameter is preferably a minute fraction (e.g., one-third) of the diameter of the driven roller, and one or more helical springs or analogous means for yieldably biasing the support toward the driven roller so that the roll of the positioning means bears against the emulsion-coated side of the film.

The likelihood of slippage of film relative to the periphery of the driven roller can be reduced still further by insuring that the film is trained over a substantial (preferably major) portion of the periphery. This can be achieved by employing one or more guide rollers which are adjacent to the periphery of the driven roller whereby the path for the film (which moves from a supply reel toward a takeup reel) passes between the driven roller and each guide roller. The guide rollers are preferably remote from the positioning roller or rollers and are preferably mounted in such a way that, if one or both guide rollers are removed, the length of that portion of the film which is trained over the driven roller decreases appreciably.

The positioning means preferably comprises two rolls which bear against the emulsion-coated side of the film at the opposite sides of the optical axis of the lens.

The novel features which are considered as characteristic of the invention are set forth in particular in the appended claims. The improved photographic apparatus itself, however, both as to its construction and its mode of operation, together with additional features and advantages thereof, will be best understood upon persual of the following detailed description of certain specific embodiments with reference to the accompanying drawing.

BRIEF DESCRIPTION OF THE DRAWING

The single FIGURE is a fragmentary central longitudinal sectional view of a continuous microfilming camera which embodies the invention.

DESCRIPTION OF THE PREFERRED EMBODIMENTS

The drawing shows a portion of a continuous microfilming camera wherein a web of photographic film 13 is transported by a driven roller 14 along an arcuate path surrounding the major part of the periphery of the roller 14. The emulsion-coated side 13a of the film 13 faces outwardly, i.e., away from the periphery of the roller 14. The length of the loop which the film 13 forms around the periphery of the roller 14 is increased by two guide rollers 15, 16, i.e., the length of the looped portion of film 13 would be appreciably less if one or both of these guide rollers were removed. The means for driving the roller 14 comprises a shaft 14a which is journalled in the housing 1 of the microfilming camera. The housing 1 comprises a portion or wall 1a having an opening 2 for the preferably cylindrical support or mount 4 for the barrel 6 of a lens 6a which images the originals (not shown) onto successive increments of the emulsion-coated side 13a. The mount 4 has internal threads in mesh with external threads of the barrel 6 so that the lens 6a can be moved toward or away from the periphery of the roller 14. The optical axis X—X of the lens 6a preferably intersects the axis of the shaft 14a.

The housing 1 further comprises a second portion or wall 1b which is outwardly adjacent to the wall 1a and has recesses for the left-hand end convolutions of helical springs 11 and 12. The right-hand end convolutions of these springs extend into shallow recesses in the adjacent end face of the mount 4, and the springs are inserted in prestressed condition so that they yieldably bias the mount in a direction (arrow B) toward the roller 14.

The front portion of the mount 4 has a slot 4a which receives at least two idle positioning rolls 9, 10 mounted on antifriction bearings 7, 8. The axes of the rolls 9, 10 are parallel to the axis of the shaft 14a, and these rolls bear against the emulsion-coated side 13a of that portion of the film 13 which is looped around the roller 14. The positioning rolls 9, 10 are spaced apart from each other to provide room for the passage of light so that light passing through the lens 6a can impinge upon successive increments of the emulsion-coated side 13a between the rolls 9, 10. The mount 4 is provided with a substantially V-shaped insert 4c defining an aperture or slit 4b which is located between the positioning rolls 9, 10 and allows the light beam to reach emulsion-coated side 13a. The rolls 9, 10 bear against the emulsion-coated side under the action of the springs 11 and 12; therefore, and since the positioning rolls are installed in the mount 4, the distance between the lens 6a and the emulsion-coated side 13a remains unchanged even if the thickness of the film 13 varies from increment to increment or periodically.

The camera further comprises means for moving the mount 4 in a direction (arrow A) away from the roller 14 in order to facilitate the threading of a fresh film from a supply reel (not shown) between the rollers 14, 15, between the roller 14 and positioning rolls 9, 10, between the rollers 14, 16, and on to the takeup reel (not shown). The moving means comprises a displacing lever 20 which is pivotable on a pin 21 and is biased clockwise, as viewed in the drawing, by a helical spring 24 attached to a post 23 of the housing and to a post 22 on the upper arm of the lever 20. The bent-over end portion of the upper arm of the lever 20 can be moved against and can displace a projection 5 of the mount 4 to thereby move the mount in the direction indicated by the arrow A. When the spring 24 is thereupon allowed to contract, the displacing lever 20 returns from its operative position to the idle position which is shown in the drawing and the springs 11, 12 immediately move the mount 4 in the direction indicated by the arrow B so that the peripheral surfaces of the rolls 9, 10 bear against the emulsion-coated side 13a of the freshly inserted microfilm. The means for pivoting the lever 20 from idle position against the opposition of the spring 24 may comprise a knob which is mounted on the lower arm of this lever and is accessible from without the housing or can be shifted by remote control. The means for transporting originals along a path located to the left of the portion 1b of the housing 1 (see the arrow D) is not shown in the drawing.

The aforediscussed fluctuations in the speed of lengthwise movement of film are reduced to an acceptable level or eliminated because the positioning rolls 9, 10 bear against the emulsion-coated side 13a opposite that portion of the periphery of the driven transporting roller 14 which is in contact with the uncoated side of the film 13. Thus, and in contrast to presently known constructions, the driven transporting roller is immediately adjacent to the positioning rolls. The guide rolls 15, 16 reduce the likelihood of slippage of the film 13 with respect to the driven roller 14 or vice versa. Moreover, and since the lens 6a shares all movements of the rolls 9, 10 in the directions indicated by arrows A and B, the sharpness of exposures is not affected by eventual fluctuations in thickness of the film 13, i.e., the distance between the lens 6a and the emulsion-coated side 13a remains unchanged.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore, such adaptations should and are intended to be comprehended within the meaning and range of equivalence of the claims.

What is claimed as new and desired to be protected by Letters Patent is set forth in the appended claims:

1. In a photographic apparatus, particularly in a continuous microfilming camera, a combination comprising means for transporting photographic film along a predetermined path, said transporting means including a driven roller rotatable about a fixed axis and the film being trained over said roller with the emulsion-coated side of the film facing outwardly; a tubular support reciprocable substantially radially of said driven roller; a lens installed in said support and arranged to image originals onto the emulsion-coated side of that portion of the film which is trained over said driven roller; positioning means including at least one roll rotatably mounted in said support intermediate said driven roller and said lens; and means for yieldably biasing said support toward said driven roller so that said roll bears against the emulsion-coated side of the film.

2. A combination as defined in claim 1, wherein said positioning means comprises two rolls disposed at the opposite sides of the optical axis of said lens.

3. A combination as defined in claim 1, wherein the diameter of said driven roller greatly exceeds the diameter of said roll.

4. A combination as defined in claim 1, further comprising at least one guide roller adjacent to the periphery of said driven roller and remote from said roll, said path extending between said rollers.

5. A combination as defined in claim 1, further comprising two guide rollers adjacent to the periphery of said driven roller and remote from said roll, said path extending between said driven roller and each of said guide rollers and said roll being disposed intermediate said guide rollers.

6. A combination as defined in claim 1, wherein said path extends along the major part of the periphery of said driven roller.

7. A combination as defined in claim 1, further comprising means for moving said support in a direction away from said roller against the opposite of said biasing means.

8. A combination as defined in claim 7, wherein said means for moving said support comprises a displacing member which is movable from an idle position to an operative position to thereby disengage said roll from the emulsion-coated side of the film in said path, and means for biasing said displacing member to said idle position.

9. A combination as defined in claim 1, further comprising a housing, said transporting means further including a drive shaft mounted in said housing and arranged to rotate said roller, said support being reciprocable in said housing and said biasing means comprising at least one resilient element reacting against said housing and bearing against said support.

10. A combination as defined in claim 1, wherein said support comprises a mount having internal threads and further comprising a barrel having external threads in mesh with said internal threads so that, when rotated in said mount, said barrel moves toward or away from said roller with respect to said mount, said lens being installed in, coaxial with and movable together with said barrel with respect to said mount.

* * * * *